United States Patent
Morimoto et al.

(10) Patent No.: US 12,490,922 B2
(45) Date of Patent: Dec. 9, 2025

(54) PHOTODETECTION SYSTEM

(71) Applicant: CANON KABUSHIKI KAISHA, Tokyo (JP)

(72) Inventors: Kazuhiro Morimoto, Kanagawa (JP); Daiki Shirahige, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1091 days.

(21) Appl. No.: 17/374,809

(22) Filed: Jul. 13, 2021

(65) Prior Publication Data

US 2022/0022781 A1   Jan. 27, 2022

(30) Foreign Application Priority Data

Jul. 21, 2020   (JP) ................................ 2020-124550

(51) Int. Cl.
| | | |
|---|---|---|
| *A61B 5/1455* | (2006.01) | |
| *A61B 5/026* | (2006.01) | |
| *A61B 5/145* | (2006.01) | |
| *G01N 21/41* | (2006.01) | |
| *G01N 33/49* | (2006.01) | |
| *H10F 30/225* | (2025.01) | |

(52) U.S. Cl.
CPC .......... *A61B 5/1455* (2013.01); *A61B 5/0261* (2013.01); *A61B 5/14532* (2013.01); *G01N 21/4133* (2013.01); *G01N 33/492* (2013.01); *H10F 30/225* (2025.01)

(58) Field of Classification Search
CPC .................................................. A61B 5/1455
See application file for complete search history.

(56) References Cited

U.S. PATENT DOCUMENTS 5,526,118 A    6/1996   Miyagawa et al.

FOREIGN PATENT DOCUMENTS

| JP | S63179223 A | 7/1988 |
| JP | H09203666 A | 8/1997 |
| JP | 2009501915 A | 1/2009 |
| JP | 2011247687 A | 12/2011 |

OTHER PUBLICATIONS

Genevieve Gariepy, et al.; "Single-Photon Sensitive Light-In-Flight Imaging;" Nature Communications, Article Published Jan. 27, 2015; pp. 1-7.
Kazuhiro Morimoto, et al.; :Superluminal Motion-Assisted Four-Dimensional Light-in-Flight Imaging;Physical Review X 11, 011005 (2021); pp. 1-10.
Kazuhiro Morimoto, et al.; Superluminal Motion-Assisted 4-Dimensional Light-in-Flight Imaging; Physics Optics; Jul. 18, 2020; pp. 1-7.

*Primary Examiner* — Marjan Fardanesh
(74) *Attorney, Agent, or Firm* — Canon U.S.A., Inc. IP Division

(57) ABSTRACT

A system includes a light source configured to emit pulsed laser light, and a photodetection unit including a plurality of photoelectric conversion units arranged in a two-dimensional plane, wherein an emission timing of the light source and a detection timing of the photodetection unit are controlled by a timing control unit, wherein the photodetection unit detects scattered light on the two-dimensional plane, of the pulsed laser light emitted from the light source and entering an object, and wherein change of a refractive index of the object is estimated from change of light speed of the scattered light.

13 Claims, 14 Drawing Sheets

MOVING OBJECT TRAVELING AT SPEED SUFFICIENTLY SLOWER THAN LIGHT SPEED

PULSED LIGHT TRAVELING AT LIGHT SPEED

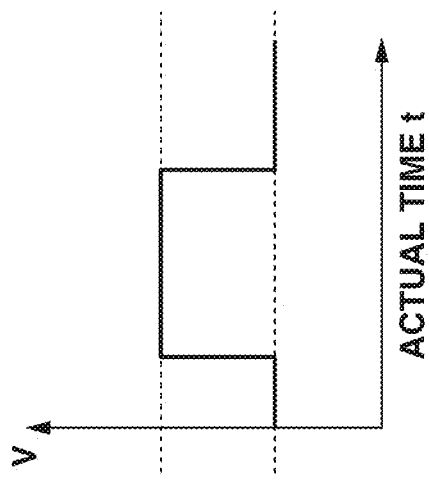
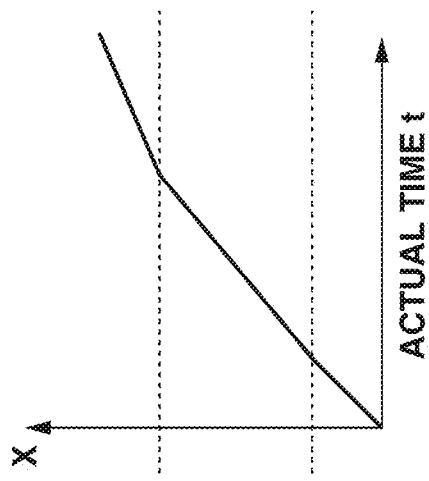
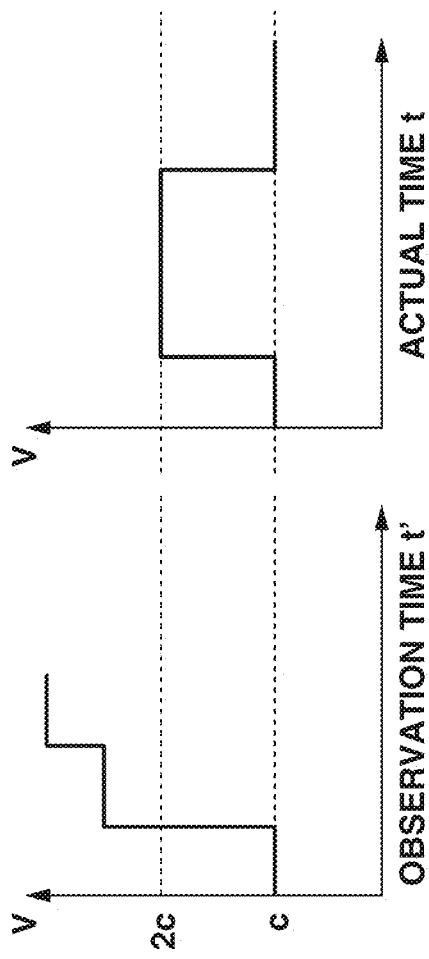
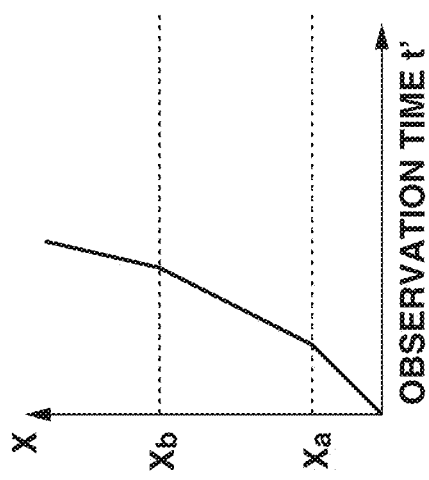
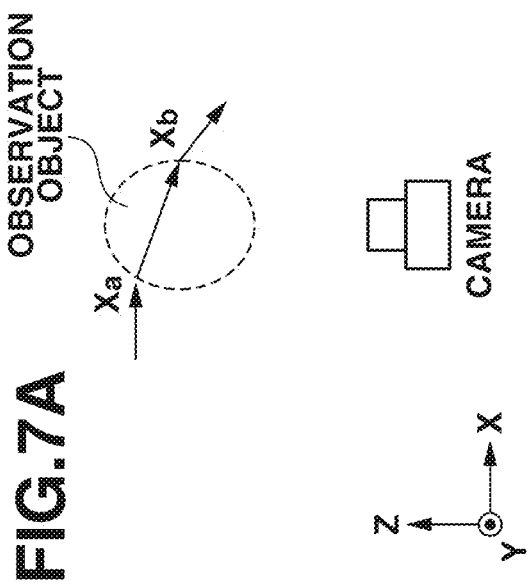

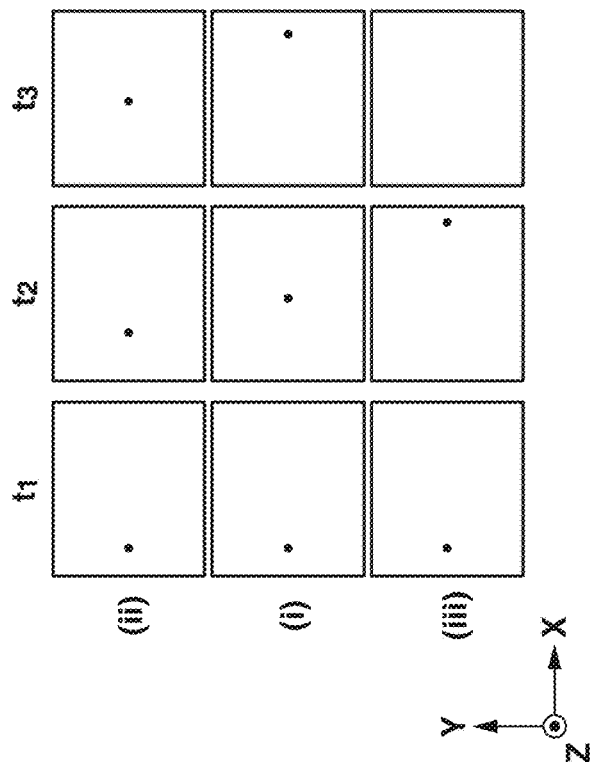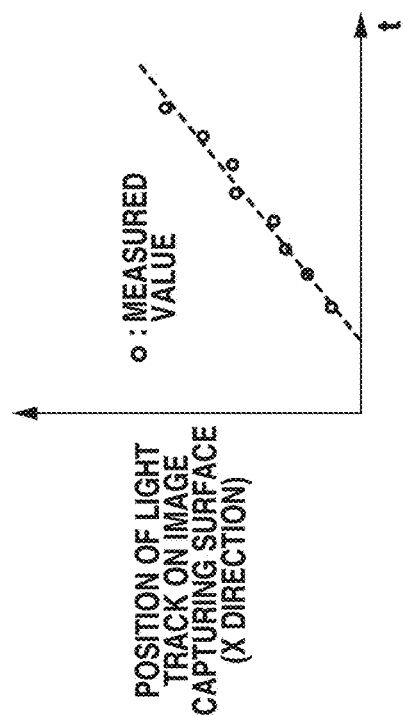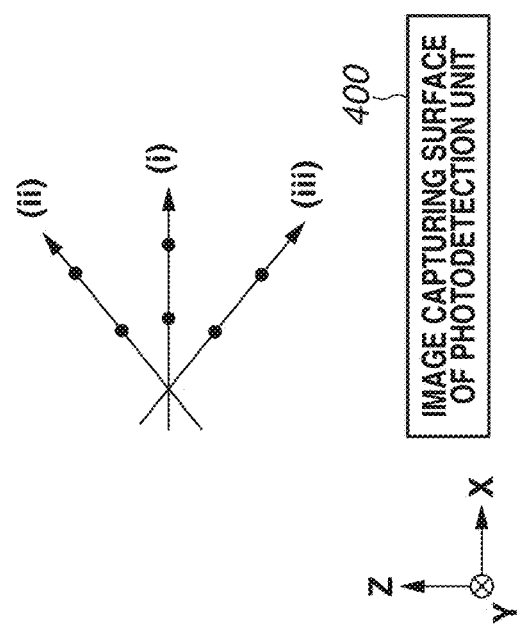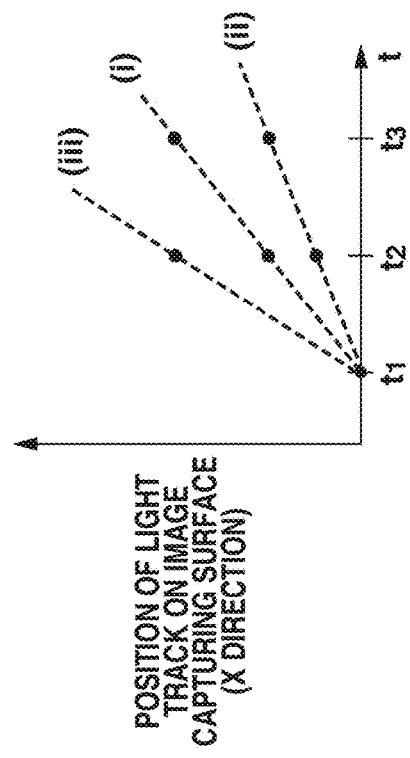

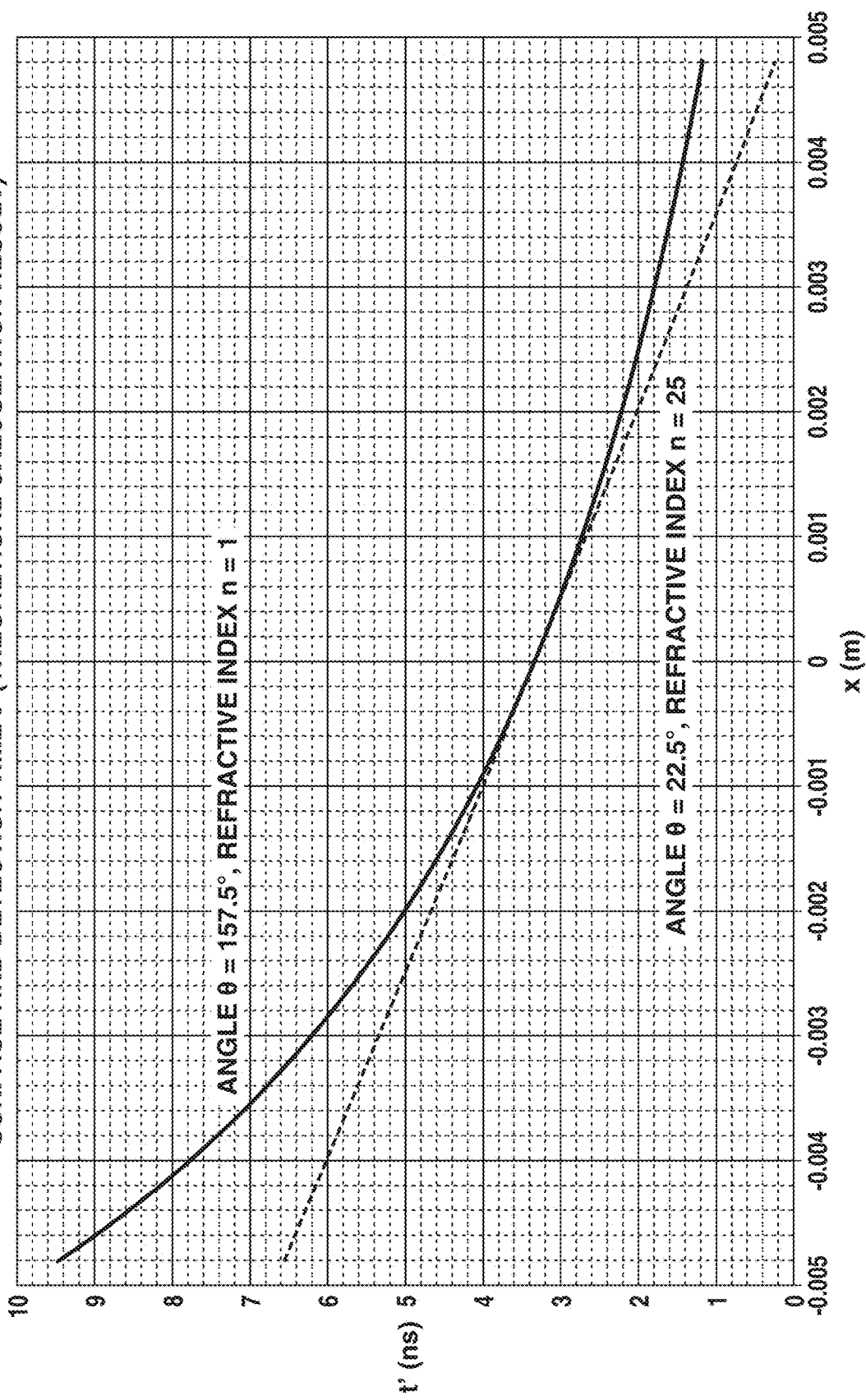

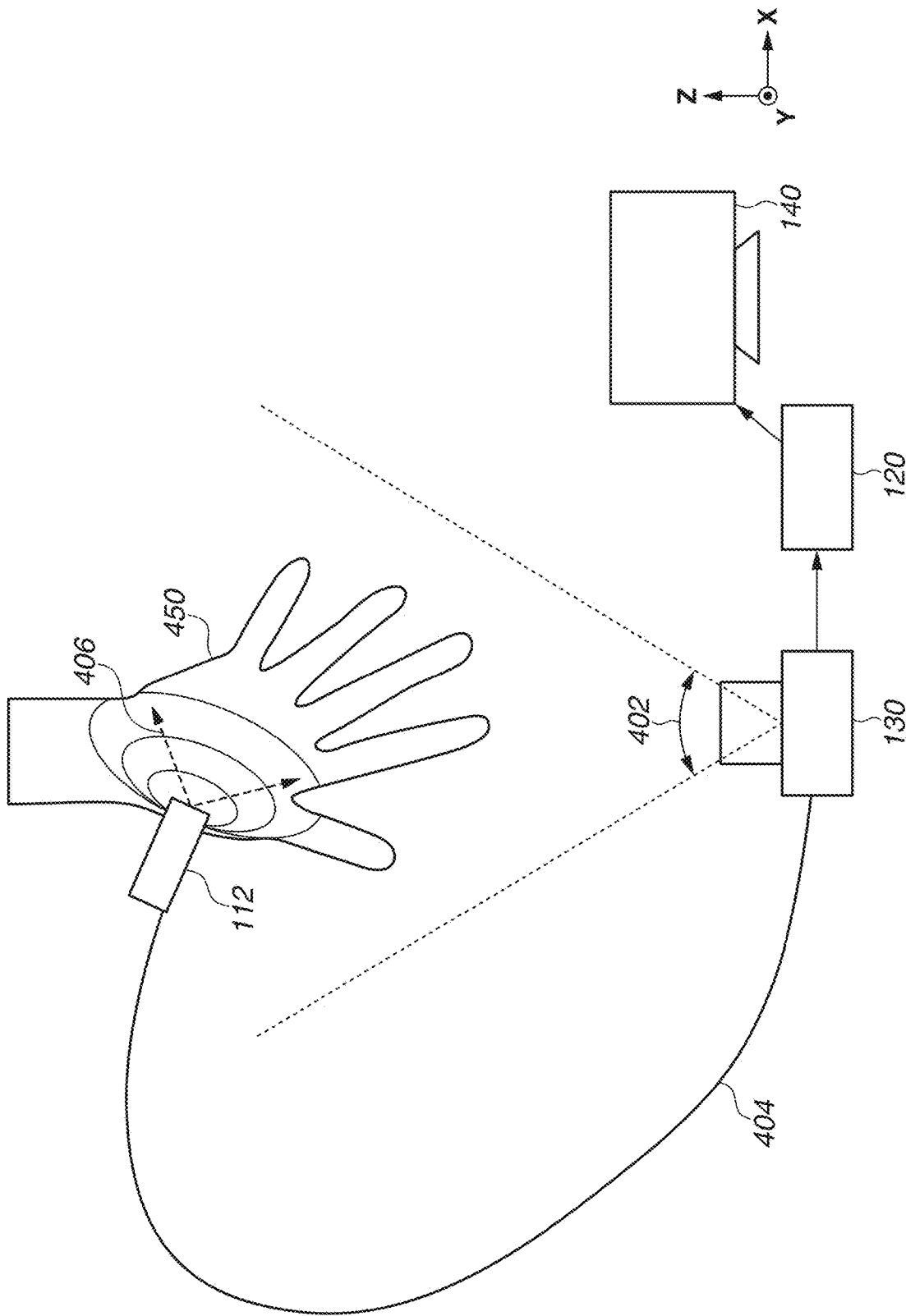

PHOTODETECTION SYSTEM

BACKGROUND

Field

The aspect of the embodiments relates to a photodetection system.

Description of the Related Art

Japanese Patent Application Laid-Open No. 2011-247687 discusses a refractive index distribution measuring apparatus including a light source and an image capturing device. In the refractive index distribution measuring apparatus discussed in Japanese Patent Application Laid-Open No. 2011-247687, a test object is disposed between the light source and the image capturing device, and a transmitted wavefront of the test object is measured by using the image capturing device. In addition, a method of determining a refractive index distribution of the test object by using a measurement result of the transmitted wavefront is also discussed.

The refractive index distribution measuring apparatus discussed in Japanese Patent Application Laid-Open No. 2011-247687 can obtain information on the refractive index distribution in a direction parallel to a light incident surface of the image capturing device, but cannot obtain information on the refractive index distribution in a direction perpendicular to the light incident surface of the image capturing device. In other words, the refractive index distribution measuring apparatus discussed in Japanese Patent Application Laid-Open No. 2011-247687 can obtain a two-dimensional refractive index distribution parallel to the light incident surface of the image capturing device, but cannot obtain a three-dimensional refractive index distribution including the direction perpendicular to the light incident surface of the image capturing device.

SUMMARY

According to an aspect of the embodiments, a system includes a light source configured to emit pulsed laser light, and a photodetection unit including a plurality of photoelectric conversion units arranged in a two-dimensional plane, wherein an emission timing of the light source and a detection timing of the photodetection unit are controlled by a timing control unit, wherein the photodetection unit detects scattered light on the two-dimensional plane, of the pulsed laser light emitted from the light source and entering an object, and wherein change of a refractive index of the object is estimated from change of light speed of the scattered light.

Further features of the present disclosure will become apparent from the following description of exemplary embodiments with reference to the attached drawings.

BRIEF DESCRIPTION OF THE DRAWINGS

FIGS. 7A to 7E are diagrams illustrating effects of the photodetection system according to the first exemplary embodiment.

FIGS. 8A to 8D are diagrams illustrating a concept of calculation processing of the photodetection system.

FIG. 9 is a diagram illustrating a relationship between a light track position and a detection time.

FIG. 14 is a configuration diagram illustrating a positional relationship among a photodetection unit, a light source, and an object according to a sixth exemplary embodiment.

DESCRIPTION OF THE EMBODIMENTS

Figure 1:
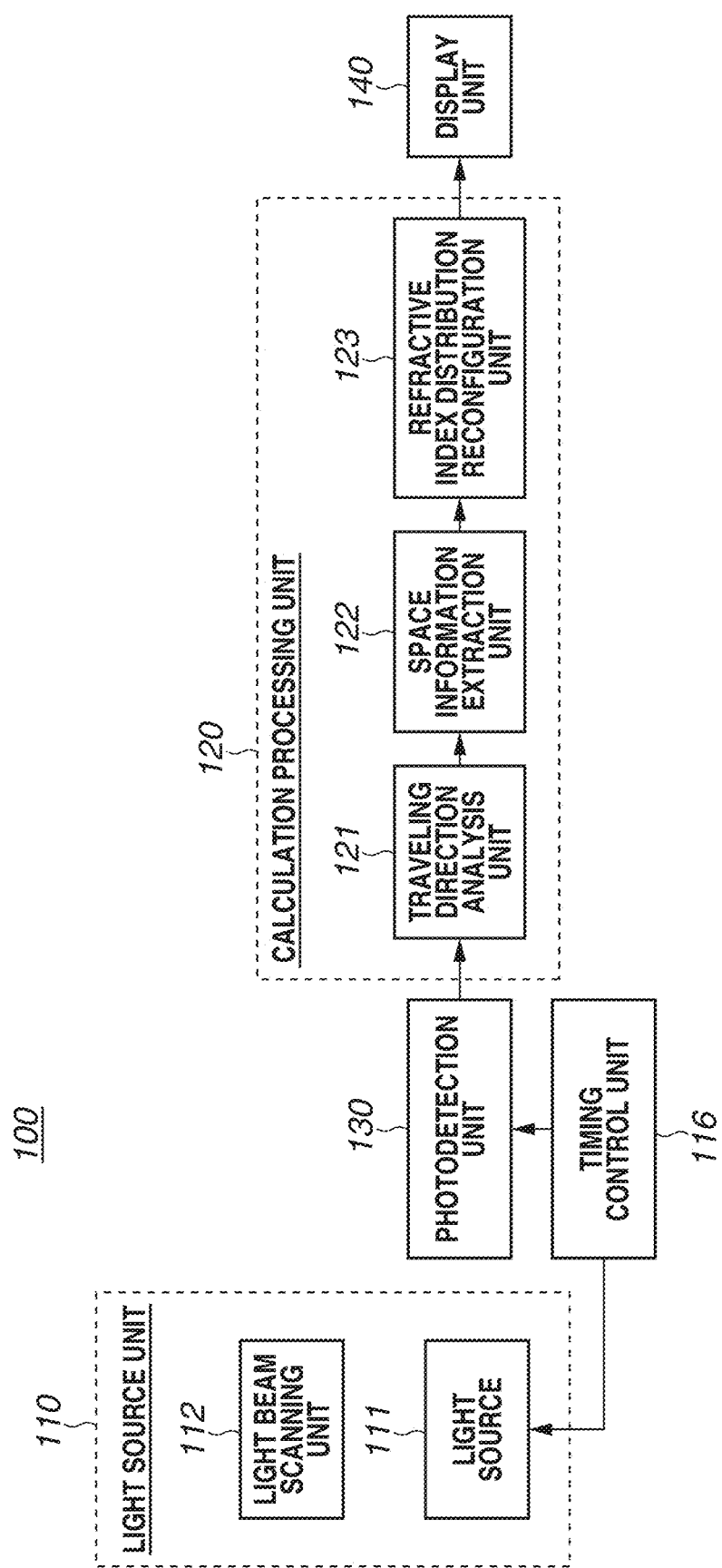
FIG. 1 is a block diagram illustrating a concept of a photodetection system according to a first exemplary embodiment.

Exemplary embodiments described below are to embody a technical idea of the present disclosure and the present disclosure is not limited to the exemplary embodiments. Sizes and positional relationships of components illustrated in drawings are exaggerated to make description clear in some cases. In the following description, the same components are denoted by the same reference numerals, and descriptions of the components are omitted in some cases.

FIG. 1 is a block diagram illustrating a configuration of a photodetection system 100 according to a first exemplary embodiment.

A light source unit 110 includes at least a light source 111. The light source unit 110 may further include a light beam scanning unit 112 that performs scanning with light from the light source 111 by changing a traveling direction of the light.

The light source 111 can emit pulsed laser light. As the light source 111, for example, a picosecond laser can be used. Although a wavelength of light emitted from the light source is not particularly limited, for example, a light source emitting infrared light can be used. The light source emitting infrared light is a light source having a peak wavelength of 750 nm or more and 1500 nm or less. The laser light from the light source 111 may have any of a dot shape, a linear shape, and a plane shape.

A light beam scanning unit 112 can change the traveling direction of the laser light emitted from the light source 111. The light beam scanning unit 112 can use, for example, a microelectromechanical systems (MEMS) scanning mirror.

A photodetection unit 130 is a unit detecting scattered light generated from the pulsed laser light emitted from the light source 111. The photodetection unit 130 may detect the pulsed laser light emitted from the light source 111. The photodetection unit 130 includes a plurality of pixels arranged in X and Y directions. Each of the pixels includes a photoelectric conversion unit. As the photoelectric conversion unit, an avalanche photodiode (APD) causing avalanche multiplication is used. In particular, a single photon avalanche diode (SPAD) that detects a feeble signal of a single photon level at high speed by using Geiger-mode operation is used. The photoelectric conversion unit may be a photodiode (PD) not causing avalanche multiplication.

A timing control unit 116 controls a start timing of light emission by the light source 111 and a start timing of photodetection by the photodetection unit 130. In other words, the timing control unit 116 synchronizes the start timing of the light emission by the light source 111 with the start timing of the photodetection by the photodetection unit 130. The term "synchronization" used herein includes not only a case where the start timing of the light emission by the light source 111 and the start timing of the photodetection by the photodetection unit 130 are made coincident with each other, but also a case where the start timing of the light emission by the light source 111 and the start timing of the photodetection by the photodetection unit 130 are shifted from each other and the shift is based on control signals from the timing control unit 116. In other words, the term "synchronization" used herein means that the start timing of the light emission by the light source 111 and the start timing of the photodetection by the photodetection unit 130 are controlled based on the control signals from the timing control unit 116.

A calculation processing unit 120 processes a signal detected by the photodetection unit 130. The calculation processing unit 120 includes a traveling direction analysis unit 121, a space information extraction unit 122, and a refractive index distribution reconfiguration unit 123.

The traveling direction analysis unit 121 calculates traveling directions of the laser light from two-dimensional space light quantity distribution information of a plurality of frames output from the photodetection unit 130. In other words, the traveling direction analysis unit 121 calculates the traveling directions of the light in an XY plane (two-dimensional plane) from X-direction information x, Y-direction information y, and time information t. In addition, the traveling direction analysis unit 121 classifies light tracks of each of the traveling directions of the light, into a plurality of groups.

The space information extraction unit 122 extracts space information on a Z-direction component of each of the traveling directions of the pulsed laser light calculated by the traveling direction analysis unit 121. In the present exemplary embodiment, the space information extraction unit 122 determines refractive index change (refractive index distribution) of an object from the three-dimensional information x, y, and t. Note that, in the present exemplary embodiment, the refractive index distribution of the object is determined from the three-dimensional information x, y, and t; however, a determination method is not limited thereto. For example, four-dimensional information x, y, z, and t (on three-dimensional plane x, y, and z) may be determined from the three-dimensional information x, y, and t, and then the refractive index distribution may be determined.

The refractive index distribution reconfiguration unit 123 calculates the refractive index distribution of the object from the three-dimensional information provided from the space information extraction unit 122, and outputs information to a display unit 140. The refractive index distribution reconfiguration unit 123 may have a function of converting coordinates of the XYZ space and processing the information to enable visual recognition of the light tracks from a desired angle. A method of determining the refractive index distribution is described below.

The display unit 140 displays an image based on the information provided from the refractive index distribution reconfiguration unit 123. A user may select the information output from the refractive index distribution reconfiguration unit 123, and an image of the selected information may be displayed on the display unit 140.

Figure 2:
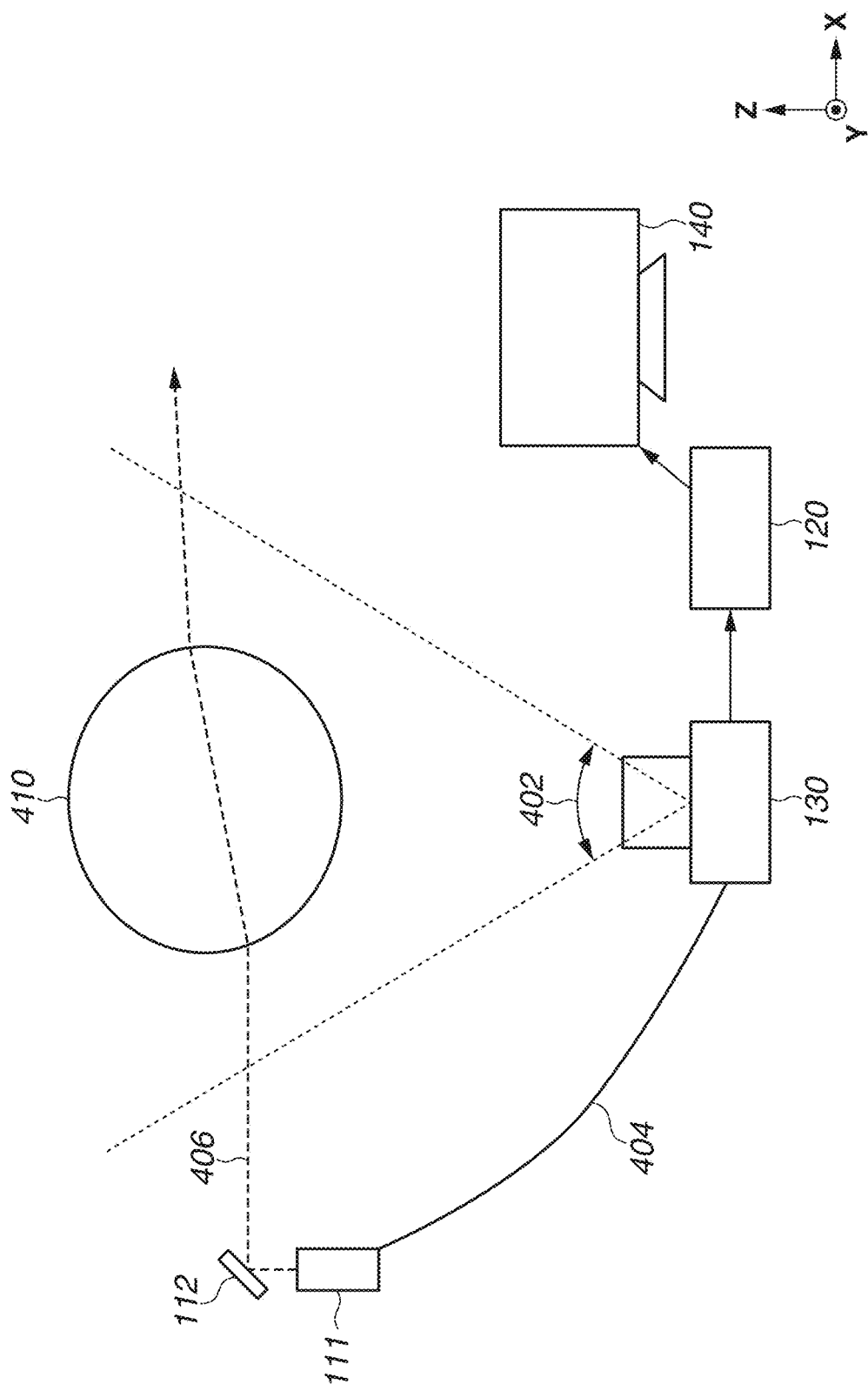
FIG. 2 is a configuration diagram illustrating positional relationship of a photodetection unit, a light source, and an object according to the first exemplary embodiment.

FIG. 2 is a conceptual diagram illustrating an arrangement example of the photodetection system 100. The components same as the components in FIG. 1 are denoted by the same reference numerals, and descriptions of the components are omitted.

An SPAD camera includes the photodetection unit 130 and the timing control unit 116. The timing control unit 116 is connected to the light source 111 through a timing synchronization unit 404. Although the timing synchronization unit 404 is connected through a cable in FIG. 2, the timing synchronization unit 404 may be connected by radio.

The SPAD camera is disposed such that at least a part of an object 410 is detected within a range of a visual field area 402 of the SPAD camera by the photodetection unit 130. The SPAD camera is disposed such that the whole of the object 410 is detected within the range of the visual field area 402 of the SPAD camera. Steam and dust are present around the object 410, and the SPAD camera detects scattered light from the object 410. In the present exemplary embodiment, the refractive index distribution of the object 410 can be measured by using the scattered light.

Figure 3:
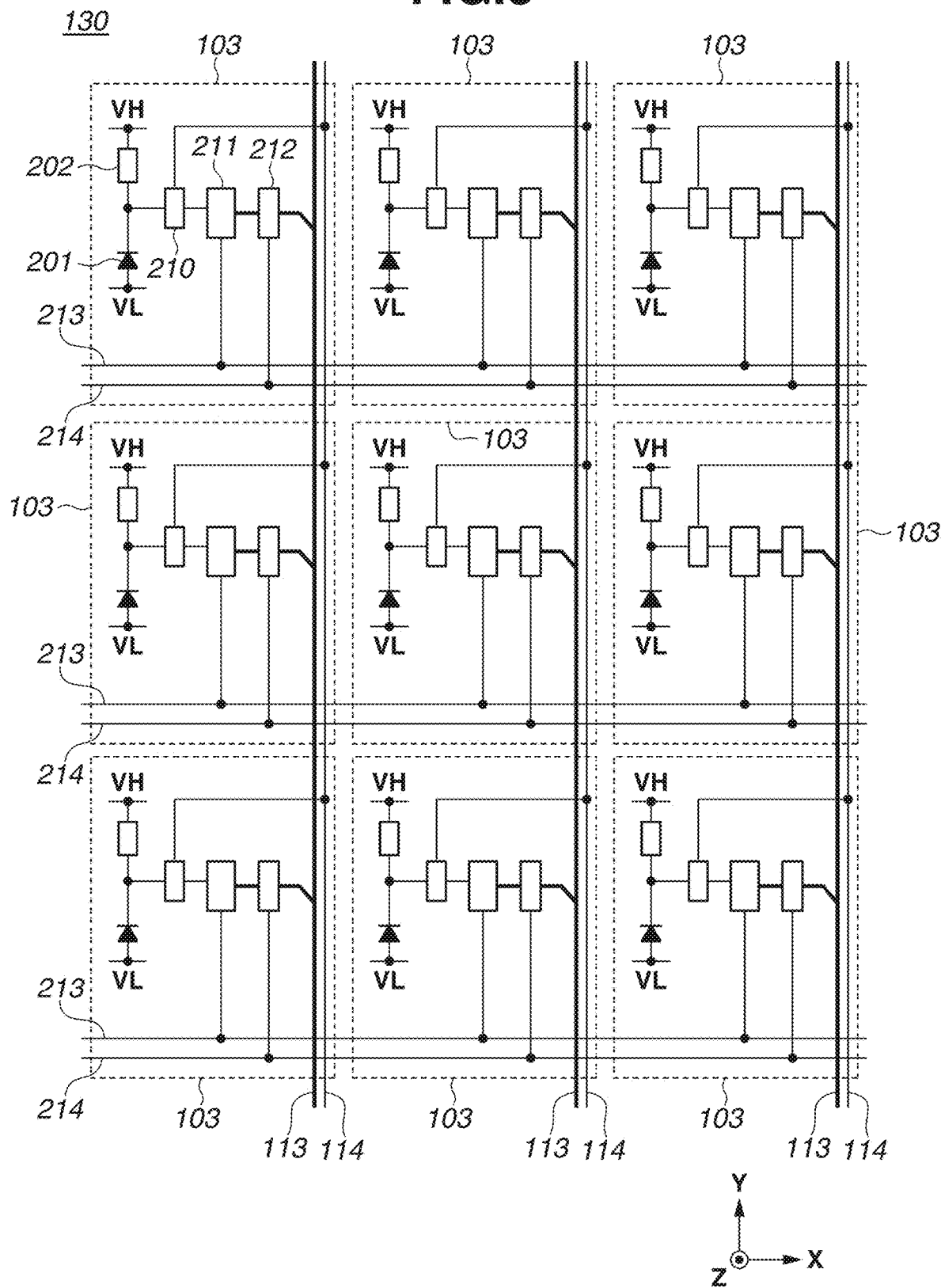
FIG. 3 is a configuration diagram of the photodetection unit according to the first exemplary embodiment.

FIG. 3 illustrates the photodetection unit 130. A plurality of pixels 103 are two-dimensionally arranged in the X and Y directions in a pixel area.

One pixel 103 includes a photoelectric conversion unit 201 (avalanche diode), a quench device 202, a control unit 210, a counter/memory 211, and a readout unit 212.

A cathode of the photoelectric conversion unit 201 is supplied with a potential VH higher than a potential VL supplied to an anode. The anode and the cathode of the photoelectric conversion unit 201 are supplied with reverse bias potentials causing avalanche multiplication of a photon entering the photoelectric conversion unit 201. When photoelectric conversion is performed while such reverse bias potentials are supplied, avalanche multiplication of an electric charge generated by incident light occurs, and an avalanche current is generated.

In the case where the reverse bias potentials are supplied and a potential difference between the anode and the cathode is greater than a breakdown voltage, the avalanche diode operates in a Geiger mode.

The quench device 202 is connected to a power supply supplying the high potential VH, and the photoelectric conversion unit 201. The quench device 202 includes a P-channel metal oxide semiconductor (MOS) transistor or a resistive device such as a poly resistor. Alternatively, the quench device 202 may include a plurality of MOS transistors connected in series. When a photocurrent is multiplied by the avalanche multiplication in the photoelectric conversion unit 201, the current obtained by multiplied electric charges flows through a connection node between the photoelectric conversion unit 201 and the quench device 202. The potential of the cathode of the photoelectric conversion unit 201 is lowered due to voltage drop by the current, and the photoelectric conversion unit 201 stops formation of electron avalanche. As a result, the avalanche multiplication of the photoelectric conversion unit 201 is stopped. Thereafter, the potential VH of the power supply is supplied to the cathode of the photoelectric conversion unit 201 through the quench device 202. Therefore, the potential supplied to the cathode of the photoelectric conversion unit 201 returns to the potential VH. In other words, the photoelectric conversion unit 201 operates in the Geiger mode again. As described above, when the electric charges are multiplied by the avalanche multiplication, the quench device 202 functions as a load circuit (quench circuit) to suppress the avalanche multiplication (quench operation). Further, the quench device 202 has a function to cause the avalanche diode to operate in the Geiger mode again after suppressing the avalanche multiplication.

The control unit 210 determines whether to count an output signal from the photoelectric conversion unit 201. For example, the control unit 210 is a switch (gate circuit) provided between the photoelectric conversion unit 201 and the counter/memory 211. A gate of the switch is connected to a pulse line 114, and the control unit 210 is turned on or off in response to a signal input to the pulse line 114. A signal based on the control signal from the timing control unit 116 in FIG. 1 is input to the pulse line 114. Gates of switches in all columns are collectively controlled. As a result, the start and end of photodetection in all of the pixels are collectively controlled. Such control is referred to as global shutter control in some cases.

The control unit 210 may include not the switch but a logic circuit. For example, when an AND circuit is provided as the logic circuit, an output from the photoelectric conversion unit 201 is handled as a first input of the AND circuit, and the signal of the pulse line 114 is handled as a second input of the AND circuit, it is possible to switch whether to count the output signal from the photoelectric conversion unit 201.

Further, it is unnecessary to provide the control unit 210 between the photoelectric conversion unit 201 and the counter/memory 211, and the control unit 210 may be a circuit providing a signal to operate or not to operate a counter of the counter/memory 211.

The counter/memory 211 counts the number of photons entering the photoelectric conversion unit 201, and holds the number of photons as digital data. A reset line 213 is provided corresponding to each row. When a control pulse is supplied from a vertical scanning circuit (not illustrated) to the reset line 213, the digital data held by the counter/memory 211 is reset.

The readout unit 212 is connected to the counter/memory 211 and a readout signal line 113. A control pulse is supplied from the vertical scanning circuit (not illustrated) to the readout unit 212 through a control line, and the readout unit 212 switches whether to output values counted by the counter/memory 211 to the readout signal line 113. The readout unit 212 includes, for example, a buffer circuit outputting the signal.

The readout signal line 113 may be a signal line to output a signal from the photodetection unit 130 to the calculation processing unit 120 or a signal line to output a signal to a signal processing unit provided inside the photodetection unit 130. Further, a horizontal scanning circuit (not illustrated) and the vertical scanning circuit (not illustrated) may be provided on a substrate provided with an SPAD array, or may be provided on a substrate different from the substrate provided with the SPAD array.

Although the configuration using the counter is described above, a time-to-digital converter (TDC) may be provided in place of the counter, and a pulse detection timing may be acquired and information on the pulse detection timing may be stored in the memory.

Figure 4:
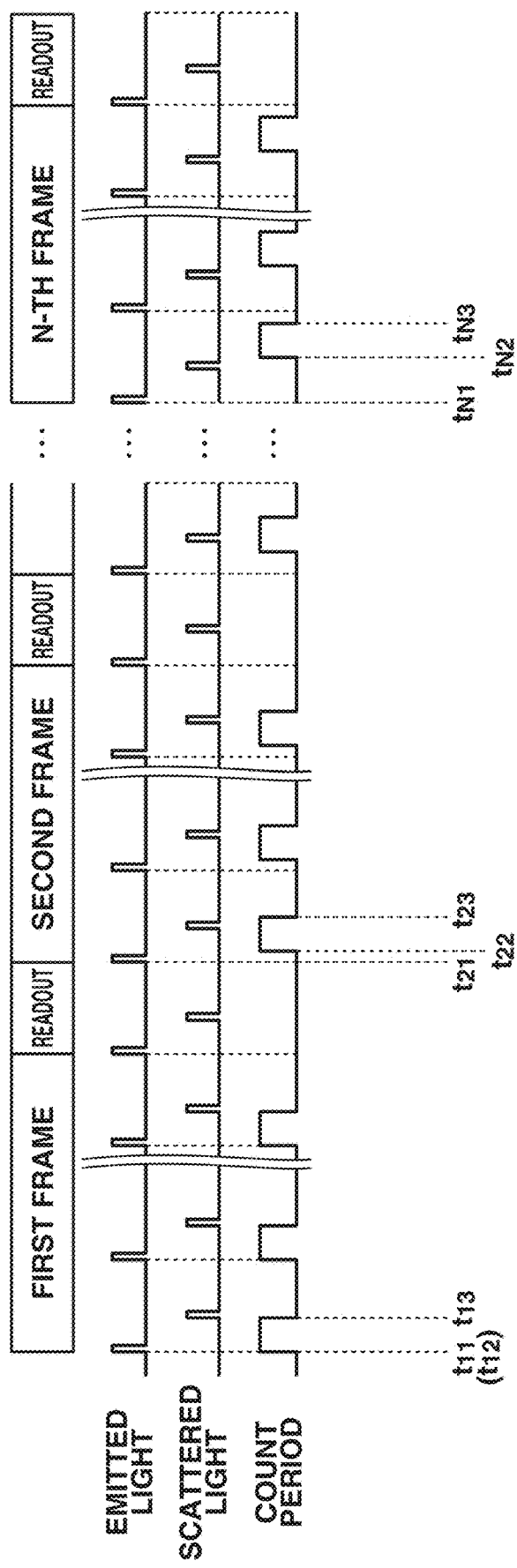
FIG. 4 is a diagram illustrating a driving pulse of the photodetection unit according to the first exemplary embodiment.

FIG. 4 illustrates a driving pulse of the photodetection system 100. FIG. 4 illustrates a timing when pulsed laser light is emitted from the light source 111, a timing when scattered light of the pulsed laser light applied to the object reaches the photodetection unit 130, and a timing when the photodetection unit 130 performs photodetection (counts light quantity).

During a first frame period, light is emitted and photodetection starts at time $t_{11}$ ($t_{12}$), and the photodetection ends at time $t_{13}$. During the first frame period illustrated in FIG. 4, at the time when the scattered light reaches the photodetection unit 130, the photodetection unit 130 does not perform the photodetection and the scattered light is not detected. The reason why the photodetection unit 130 performs the photodetection a plurality of times during the first frame period is to obtain a light quantity distribution on the XY plane. After the plurality of times of photodetection ends during each frame period, a value stored in the memory is read out.

As illustrated in FIG. 3, the plurality of pixels is arranged in an array in the photodetection unit 130, and photodetection start timings of the plurality of pixels arranged in each row are collectively controlled. In other words, during the first frame period in FIG. 4, the timing when the light is emitted is the same as the timing when the count period starts, in all of the pixels each including the SPAD.

During a second frame period, light is emitted at time $t_{21}$, photodetection starts at time $t_{22}$, and the photodetection ends at time $t_{23}$. During the second frame period, the photodetection starts after the light is emitted. In other words, during the second frame period, a time interval from the time when the light is emitted to the time when the photodetection starts is long as compared with the first frame period. During the second frame period illustrated in FIG. 4, the photodetection unit 130 performs the photodetection at the time when the scattered light reaches the photodetection unit 130, and the scattered light is detected.

Thereafter, each frame period is set such that the time interval from the time when the light is emitted to the time when the photodetection starts is gradually increased. During the N-th frame period, light is emitted at time $t_{N1}$, photodetection starts at time $t_{N2}$, and the photodetection ends at time $t_{N3}$.

The photodetection unit 130 includes the SPAD array in which the pixels each including the SPAD are two-dimensionally arranged. Accordingly, a set of data including light quantity distribution information on the XY plane and time information representing an acquisition time of the light quantity distribution information can be acquired for each of the frames by the above-described timing chart. This makes it possible to acquire the X-direction information x, the Y-direction information y, and the time information t.

A concept of a method of measuring the refractive index distribution using the photodetection system 100 according to the present exemplary embodiment is described with reference to FIGS. 5A to 5F. In the present exemplary embodiment, as described above, the speed of the light traveling in the Z direction and the refractive index distribution of the object are obtained from the light quantity distribution information on the XY plane and the time information obtained by the photodetection unit 130. More specifically, actual three-dimensional space information on tracks of the pulsed light, the corresponding time information, and the refractive index distribution of the object are obtained by using "apparent speed" obtained by the scattered light of the pulsed laser light from the light source 111. In the following, the "apparent speed" is first described.

FIGS. 5A to 5F are diagrams illustrating a difference between the apparent speed of a moving object traveling at speed sufficiently slower than light speed and the apparent speed of the pulsed light traveling at the light speed.

Figure 5A:
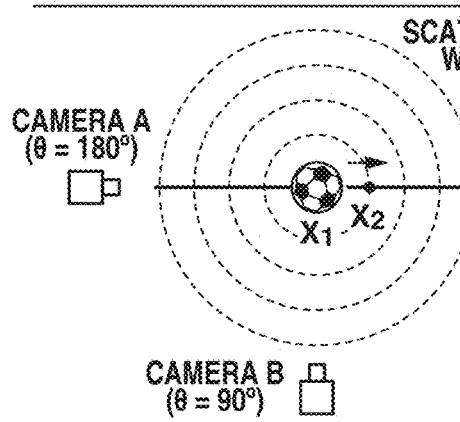
FIGS. 5A to 5F are diagrams illustrating a difference between a moving object traveling at speed slower than light speed and pulsed light traveling at the light speed.

FIG. 5A illustrates an example in which a ball moves, as an example of the moving object traveling at speed sufficiently slower than the light speed. A camera C ($\theta=0$ degrees) provided in the direction same as the traveling direction of the moving object, a camera A ($\theta=180$ degrees) provided in a direction opposite to the traveling direction of the moving object, and a camera B ($\theta=90$ degrees) provided in a direction orthogonal to the traveling direction of the moving object are illustrated.

Figure 5D:
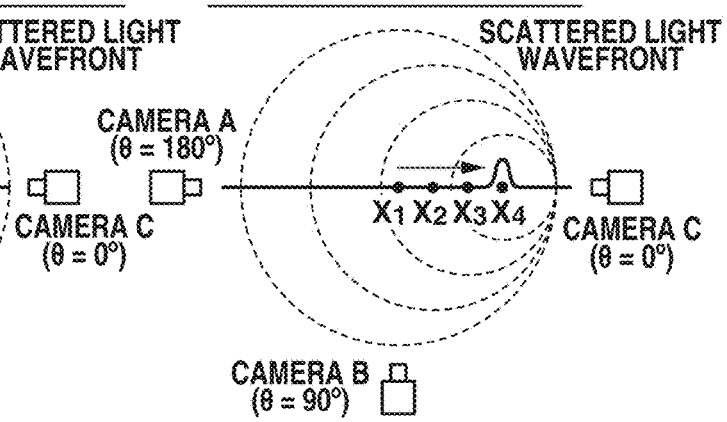
Figure 5B:
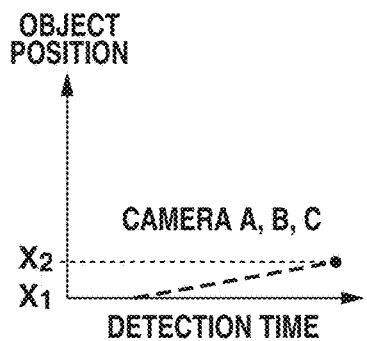

FIG. 5B illustrates a relationship between a position of the moving object (object position) and time (detection time) when each of the cameras detects the scattered light from the moving object. The moving object moves a little during the time period when the scattered light from the moving object reaches each of the cameras. Therefore, the detection time of each of the cameras A, B, and C has the same tendency irrespective of the position of the moving object.

Figure 5E:
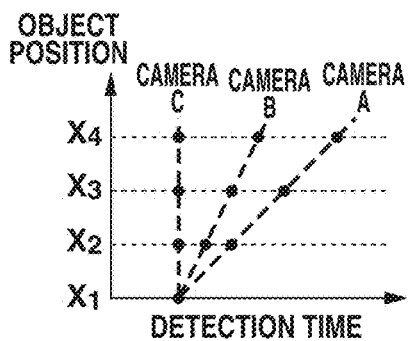
Figure 5C:
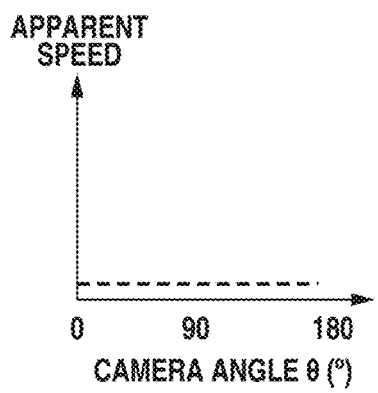

FIG. 5C illustrates a relationship between the angle $\theta$ of the camera relative to the traveling direction of the moving object and the apparent speed. The apparent speed is a moving amount of the moving object per the detection time. As illustrated in FIG. 5B, the moving amount of the moving object per the detection time is constant. Therefore, the apparent speed is also constant. FIG. 5C illustrates the relationship. In other words, the apparent speed of the moving object is constant irrespective of the traveling direction of the moving object relative to each of the cameras.

On the other hand, FIG. 5D illustrates an example of the pulsed laser light traveling at the light speed. As in FIG. 5A, the camera C ($\theta=0$ degrees) provided in the direction same as the traveling direction of the pulsed laser light, the camera A ($\theta=180$ degrees) provided in a direction opposite to the traveling direction of the pulsed laser light, and the camera B ($\theta=90$ degrees) provided in a direction orthogonal to the traveling direction of the pulsed laser light are illustrated.

FIG. 5E illustrates a relationship between a position of the pulsed laser light (object position) and time (detection time) when each of the cameras detects the scattered light generated by the pulsed light. The pulsed light itself generating the scattered light also travels during a time period when the scattered light of the pulsed light generated at a predetermined position reaches each of the cameras. Therefore, the detection times of the respective cameras A, B, and C provided at different positions are different from one another. More specifically, in the camera C, the scattered light generated at positions $X_1$ to $X_4$ is detected at the same time. In contrast, in the camera A, the scattered light generated at the positions $X_1$ to $X_4$ is detected at different times because the scattered light generated at the positions $X_1$ to $X_4$ reach the camera A in order of the positions $X_1$, $X_2$, $X_3$, and $X_4$. Also in the camera B, the scattered light generated at the positions $X_1$ to $X_4$ is detected at different times because the scattered light generated at the positions $X_1$ to $X_4$ reach the camera B in order of the positions $X_1$, $X_2$, $X_3$, and $X_4$, as in the camera A. As compared with the position where the camera A is provided, however, the position where the camera B is provided is close to the positions where the scattered light is generated. Therefore, the detection time, by the camera B, of the scattered light generated at the each position is earlier than the detection time by the camera A. As a result, the relationship illustrated in FIG. 5E is obtained.

Figure 5F:
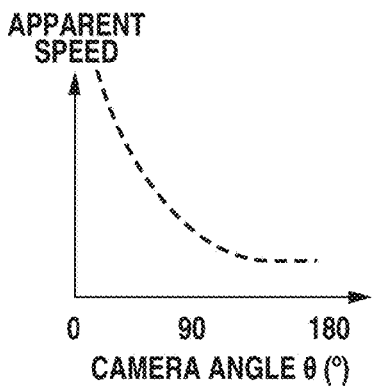

FIG. 5F illustrates a relationship between the angle $\theta$ of the camera relative to the traveling direction of the pulsed light and the apparent speed. As illustrated in FIG. 5E, the apparent speed, namely, the moving amount of the scattered light per detection time is different among the cameras. More specifically, the apparent speed of the scattered light detected by the camera B ($\theta=90$ degrees) is greater than the apparent speed of the scattered light detected by the camera A ($\theta=180$ degrees). In addition, the apparent speed of the scattered light detected by the camera C ($\theta=0$ degrees) is infinite. FIG. 5F illustrates the relationship. In other words, the apparent speed of the pulsed light is varied depending on the traveling direction of the pulsed light relative to each of the cameras. The apparent speed is described in detail below.

Figure 6:
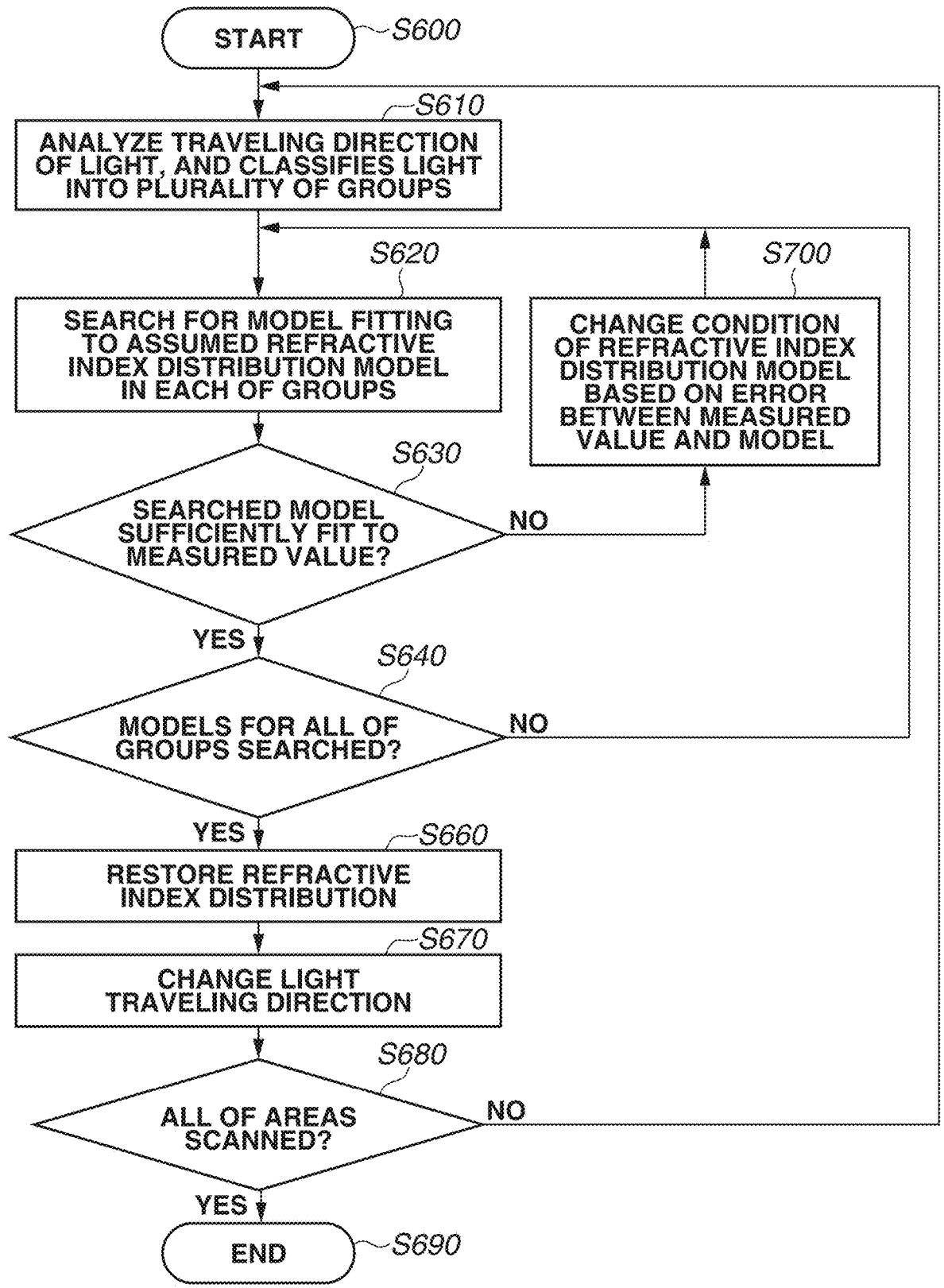
FIG. 6 is a flowchart illustrating processing performed by a calculation processing unit according to the first exemplary embodiment.

FIG. 6 is a flowchart illustrating a flow of calculation processing performed by the traveling direction analysis unit 121, the space information extraction unit 122, and the refractive index distribution reconfiguration unit 123 in FIG. 1. When the calculation processing is started, the traveling direction analysis unit 121 analyzes incident light and reflected light to analyze traveling directions (vectors of light beam) of the incident light and the reflected light, and classifies the light of each of the traveling directions, into a plurality of groups in step S610. For example, in a light beam 406 in FIG. 2, light from the light beam scanning unit 112 to the object 410 is classified into a group 1. In the light beam 406, light from incidence on the object 410 to emission from the object 410 is classified into a group 2, and light emitted from the object 410 is classified into a group 3. The grouping is performed based on the traveling direction of the light in the above-described manner.

Next, in step S620, the space information extraction unit 122 searches for a fitting model in each of the groups, by using measured light beam positional information on the image capturing surface (light quantity distribution information on the XY plane) and the time information corresponding to the positional information. More specifically, the space information extraction unit 122 creates an assumed refractive index distribution model from the positions of the scattered light and the vectors of the light beams. Further, the space information extraction unit 122 compares the refractive index distribution of the measured values with the assumed refractive index distribution model to check a fitting degree (error).

Next, in step S630, the space information extraction unit 122 evaluates fitting between the searched model and the measured values to determine whether the searched model sufficiently fits to the measured values. In a case where the searched model sufficiently fits to the measured values (YES in step S630), the processing proceeds to the next step. In a case where the searched model does not sufficiently fit to the measured values (NO in step S630), the processing returns to step S620, and the fitting model is searched again. More specifically, in step S700, an error between the measured values and the model is measured, and the condition of the refractive index distribution model is changed based on the error. The condition is changed to a condition converging the error. When the error between the measured values and the refractive index distribution model is eliminated, it is possible to measure the refractive index distribution of the object. The fitting degree may be checked by repeating calculation using a least-squares method until a sum of squares of the error between the values of the model and the measured values becomes less than or equal to a predetermined value or until the number of repeating times of the calculation becomes a predetermined number of times.

Next, in step S640, it is determined whether models for the measured values of all of the groups have been searched. In a case where the search for all of the groups has not been completed (NO in step S640), the processing in step S620 is performed on the remaining group. In a case where the search for all of the groups has been completed (YES in step S640), the processing proceeds to a next step.

Next, in step S660, the Z-direction information on the light beam and the refractive index distribution information on the object are restored from each of the searched models. In FIG. 2, the light beam traveling direction in the Z direction may be different among the light beam in the group 1, the light beam in the group 2, and the light beam in the group 3. The light beam traveling information in the Z direction can be restored by using the apparent speed and the light beam traveling direction in the XYZ space can be determined, and at the same time, the refractive index information on the object can be determined by using the traveling speed of the light beam and a refraction angle when the light beam enters the object.

Next, in step S660, the refractive index distribution is restored from the X-direction information, the Y-direction information, the Z-direction information, and the time information on the light beam. The refractive index distribution is determined from the light beam in the X, Y, and Z directions. The refractive index distribution can be determined by using a refractive index n of the object, an incident angle of the light beam (incident light) in the group 1, and a refraction angle (emitted light) of the light beam (refracted light) in the group 2 after the light beam enters the object.

The processing in steps S610 to S660 is repeatedly performed while the traveling direction of the light applied to the object is changed in step S670. The processing is repeatedly performed until all of areas of the object are scanned. In a case where scanning of all of the areas has been completed (YES in step S680), the processing ends in step S690. In a case where the scanning of all of the areas has not been completed (NO in step S680), the processing in steps S610 to S670 is performed on the remaining area.

The refractive index distribution of the object can be measured by the above-described method. Note that the processing in step S660 is optional. In other words, every pieces of measurement information corresponding to different light emission directions may be acquired without restoring the refractive index distribution, and then processing of restoring the refractive index distribution may be performed.

Next, effects by measurement of the refractive index distribution in the case where the apparent speed is used are described in comparison with a comparative example in which the apparent speed is not used. In the comparative example and the exemplary embodiment, the arrangement relationship is as illustrated in FIG. 7A. The refractive index of the object in FIG. 7A is higher than the refractive index of the outside.

The laser light applied to the object enters the object, and the traveling direction of the laser light is refracted in a direction toward the camera. FIG. 7B illustrates an exemplary image of positions of the laser light, and FIG. 7C illustrates actual positions of the laser light. An elapsed time of an observation time t' and an elapsed time of an actual time t are equal to each other. As illustrated in FIG. 7A, there is a case where change in light speed cannot be accurately observed in the captured image even though the refractive indices are different. For example, in FIG. 7C, the laser light takes time to move from a position $X_a$ to a position $X_b$, whereas in FIG. 7B, the observation time becomes short because of influence by the apparent speed. In the present exemplary embodiment, since correction can be performed by using the apparent speed, it is possible to obtain accurate refractive index distribution.

A difference of the refractive index distribution measurement result between the case where the apparent speed is not used and the case where the apparent speed is used is described with reference to FIGS. 7A to 7E. A case is considered where the light track in the case where the pulsed light is applied to an observation target is imaged by a camera as illustrated in FIG. 7A. In this case, the refractive index n in the air around the observation target is set to 1, and the refractive index n inside the observation target is set to 2. A traveling direction angle of the light entering the observation target is changed by a refraction phenomenon at interfaces $X_a$ and $X_b$ of the observation target. A graph in FIG. 7B illustrates a relationship between a position X of the pulsed light captured by the camera and the observation time Since the traveling direction of the pulsed light transitions to the direction toward the camera due to the refraction phenomenon, the apparent speed is increased due to the phenomenon described with reference to FIGS. 5A to 5F. If light speed V is estimated by using the measurement result as is, the light speed is estimated as illustrated in FIG. 7D. In a case where the pulsed light travels perpendicularly to the camera, the light speed can be accurately measured. When the angle of the pulsed light is changed, however, estimation accuracy of the light speed is deteriorated due to change in the apparent speed. Accordingly, estimation accuracy of the refractive index of the observation target is also deteriorated. In contrast, in a case where the relationship between the actual positions of the pulsed light and the corresponding time can be restored as illustrated in FIG. 7C by using the result in FIG. 7B, the light speed can be accurately calculated as illustrated in FIG. 7E without being influenced by the apparent speed. Therefore, the refractive index information can be restored with high accuracy.

(Concept of Calculation Processing)

FIGS. 8A to 8D are diagrams illustrating a concept of the processing performed by the calculation processing unit 120 in FIG. 2.

In FIG. 8A, the photodetection unit 130 has an image capturing surface 400. The image capturing surface 400 has an XY plane. Arrows represent vectors in the light traveling directions. An arrow (i) represents light traveling in a direction parallel to the image capturing surface 400, an arrow (ii) represents light traveling in a direction apart from the image capturing surface 400, and an arrow (iii) represents light traveling in a direction toward the image capturing surface 400. In FIG. 8A, the light includes vector components in the X and Z directions and does not include a vector component in the Y direction, for simplification.

FIG. 8B illustrates light tracks of the above-described light (i) to (iii) imaged on the image capturing surface 400 at times ti to $t_3$. In a case where a frame rate is low, each of the light tracks is observed as linear light. In a case of the light having the low apparent speed, the light track is observed as light leaving a tail. In this example, a rising part of the light intensity (a head part of a light track) in the light traveling direction is illustrated.

As illustrated in FIG. 8B, the light includes the vector components in the X and Z directions; however, the vector component in the Z direction is projected on the XY plane imaged at each time, and therefore, information in the Z direction cannot be extracted. As illustrated in FIG. 8B, as compared with the light (i), the light (ii) is low in apparent speed. In contrast, as compared with the light (i), the light (iii) is high in apparent speed.

FIG. 8C is a diagram illustrating a relationship between the times ti to $t_3$ and the position of the light track on the image capturing surface (in X direction). In FIG. 8C, the light (i) to (iii), namely, the light different in vector component in the Z direction is described by different functions.

For example, in a case of using linear approximation, the position in the X direction (objective variable)=a+b·time (explanatory variable) is established, and values of coefficients a and b are varied depending on the difference of the vector component in the Z direction.

To describe an actual light track, the vector component in the Y direction, a distance between a position where the scattered light is generated and the image capturing surface for the photodetection, and a nonlinear effect caused by temporal change of a direction vector from the photodetection unit to the pulsed light with traveling of the pulsed light are considered. Therefore, the number of variables and coefficients is increased to complicate the model; however, it is the same that the function describing the light positional information on the image capturing surface and the time information depends on the vector component of the light in the Z direction.

FIG. 8D is a graph in which data (measured values) measured by the photodetection unit 130 is plot in the time axis and the axis representing the light position on the image capturing surface (in the X direction), in a manner similar to FIG. 8C. When a function fitting to each of the measured values is searched, and the vector component in the Z direction can be extracted from the searched function, the vector component in the Z direction can be estimated.

More specifically, a model to calculate one-dimensional positional information (vector information in the X direction) on the photodetection unit 130 and time information is created based on the two-dimensional space information (vector information in the X and Z directions) and the time information. In addition, when the vector information in the X and Z directions and the time information sufficiently explaining the X-direction information and the time information as the measured data can be searched, the vector component in the Z direction can be estimated. In such a calculation, movement of the light as the observation target is estimated from the measurement data. Therefore, such a calculation can be expressed as solving of an inverse issue.

Further, the dimension is expanded, and a model to calculate the two-dimensional space information (vector information in the X and Y directions) on the photodetection unit 130 and the time information is created from the three-dimensional space information (vector information in the X, Y, and Z directions) and the time information. In addition, when the three-dimensional space information (vector information in the X, Y, and Z directions) and the time information sufficiently explaining the information in the X and Y directions and the time information (data set) as the measured data can be searched, the vector component in the Z direction can be estimated. More specifically, fitting of the data set with the two-dimensional space information on the photodetection unit and the time information calculated by using the model is performed to acquire the three-dimensional space information and the time information. Thereafter, the vector component in the Z direction is estimated from the acquired three-dimensional space information and the acquired time information.

(Description of Calculation Model)

An example of the model used for calculation is described below. In place of the model described below, a more complicated model considering lens aberrations, nonuniformity of sensor characteristics, etc. may be used. Further, in place of solving the least-squares method, parameter estimation using a neural network model or the like may be performed.

Temporal change of a position of pulsed laser light represented by an expression (1) can be described by an expression (2), $$\vec{r}(t) \tag{1}$$

$$\vec{r}(t)=(x(t),y(t),z(t))=\vec{r}_0+ct\cdot\vec{n} \tag{2}$$

where an expression (3) is a constant vector independent of time, and c is light speed, and an expression (4) is a normalization vector representing a light propagation direction, $$\vec{r}_0=(x_0,y_0,z_0) \tag{3}$$

$$\vec{n}=(n_x,n_y,n_z) \tag{4}$$

Further, t is a time when the pulsed laser light reaches a position represented by an expression (5), and has an offset to the time t', $$\vec{r}(t) \tag{5}$$

The time t' is a time when the pulsed laser light positioned at a position represented by an expression (6) is detected by a camera, $$\vec{r}(t) \tag{6}$$

A position of the pulsed laser light projected on an image capturing surface (focal plane) of a photodetector is represented by an expression (7), $$\vec{r}_p(t)=(x_p,y_p,z_p)=\alpha(t)\cdot\vec{r}(t) \tag{7}$$

where $\alpha(t)$ is a coefficient dependent on the time, and $-z_p$ is a focal length. When it is assumed that the focal length $z_p$ is independent of the time, the coefficient $\alpha(t)$ can be described as $\alpha(t)=z_p/(z_0+ct\cdot n_z)$. Movement of the pulsed laser light geometrically projected on the image capturing surface of the photodetector can be described by the following expression (8), $$x_p(t) = \frac{z_p}{z_0 + ct\cdot n_z}\cdot(x_0+ct\cdot n_x),\ y_p(t)=\frac{z_p}{z_0+ct\cdot n_z}\cdot(y_0+ct\cdot n_y). \tag{8}$$

Considering a light propagation time from a position represented by an expression (9) to the photodetector, the observation time t' can be described by the following expression (10), $$\vec{r}(t) \tag{9}$$

$$t' = t + \frac{|\vec{r}(t)|}{c} = t + \frac{1}{c}\cdot\sqrt{|\vec{r}_0|^2+2ct(\vec{r}_0\cdot\vec{n})+c^2t^2}. \tag{10}$$

The above-described equation is solved, the following expression (11) is obtained, $$t = f(t') = \frac{1}{2}\cdot\frac{c^2 t'^2 - |\vec{r}_0|^2}{c^2 t' + c(\vec{r}_0\cdot\vec{n})}. \tag{11}$$

When the expression (11) is substituted in the expression (8), the position of the pulsed laser light projected on the image capturing surface that is the function of the observation time t' can be descried as the following expression (12), $$x_p(t') = \frac{z_p}{z_0 + c \cdot f(t') \cdot n_z}(x_0 + c \cdot f(t') \cdot n_x), \quad (12)$$

$$y_p(t') = \frac{z_p}{z_0 + c \cdot f(t') \cdot n_z} \cdot (y_0 + c \cdot f(t') \cdot n_y).$$

By time-resolved measurement, N sets of three-dimensional data points ($X_p^i$, $Y_p^i$, and $T'^i$) can be acquired, where i is 1, 2, ..., N. To reproduce four-dimensional light, seven parameters $x_0$, $y_0$, $z_0$, $n_x$, $n_y$, $n_z$, and c are set, and an optimization issue represented by the following expression (13) is solved, $$(\vec{r}_0 \cdot \vec{n}) = \underset{\vec{r}_0, \vec{n}}{\operatorname{argmin}} \left[ \sum_i^N \left\{ X_p^i - \frac{z_p}{z_0 + c \cdot f(T'') \cdot n_z} \cdot (x_0 + c \cdot f(T'') \cdot n_x) \right\}^2 + \sum_i^N \left\{ Y_p^i - \frac{z_p}{z_0 + c \cdot f(T) \cdot n_z} (y_0 + c \cdot f(T'') \cdot n_y) \right\}^2 \right], \quad (13)$$

where N is the total number of measurement data points, ($X_p^i$, $Y_p^i$) is a position of a pixel on the image capturing surface relating to the i-th data point, $-z_p$ is a focal length, $T'^i$ is an observation time measured for the i-th data point, and an expression (14) is a position of the pulsed laser light at the time t=0, $$\vec{r}_0 = (x_0, y_0, z_0) \quad (14)$$

The light propagation vector normalized in the expression (13) can be represented by an expression (15) in a polar coordinate system, $$\vec{n} = (\sin\theta \cos\phi, \sin\theta \sin\phi, \cos\theta) \quad (15)$$

When the expression (13) is converted into the polar coordinate system, the following expressions (16) and (17) are obtained, $$(\vec{r}_0, \theta, \phi) = \underset{\vec{r}_0, \theta, \phi}{\operatorname{argmin}} \quad (16)$$

$$\left[ \sum_i^N \left\{ X_p^i \frac{z_p}{z_0 + c \cdot f(T'') \cdot \cos\theta} \cdot (x_0 + c \cdot f(T'') \cdot \sin\theta \cos\phi) \right\}^2 + \sum_i^N \left\{ Y_p^i - \frac{z_p}{z_0 + c \cdot f(T'') \cdot \cos\theta} (y_0 + c \cdot f(T'') \cdot \sin\theta \sin\phi) \right\}^2 \right],$$

$$f(T') = \frac{1}{2} \cdot \frac{c^2 T'^2 - (x_0^2 + y_0^2 + z_0^2)}{c^2 T' + c(x_0 \sin\theta \cos\phi + y_0 \sin\theta \sin\phi + z_0 \cos\theta)}, \quad (17)$$

In the above-described expressions (16) and (17), six parameters $x_0$, $y_0$, $z_0$, $\theta$, $\phi$, and c are set, and an optimization issue is solved.

The model described above have the following three features.

A first feature is that "straight advance property of light" and "principle of constancy of light velocity" are assumed. A second feature is that the two-dimensional coordinates (Xp, Yp) on the image capturing surface are calculated by projecting the position (x, y, z) of the pulsed light onto the image capturing surface. A third feature is that the detection time T' is calculated in consideration of the time necessary for the scattered light to reach the camera, in contrast to the time t necessary for the pulsed light to reach the position (x, y, z).

In the case of the track including the small number of data points, the value may diverge or converge to a wrong solution in solving the optimization issue. At this time, when continuity of light tracks is assumed, it is possible to avoid such an issue. More specifically, in a case where a plurality of tracks is present, a constraint condition that a start point of a second track is an end point of a first track is added.

More specifically, as for the second track, a cost function (loss function) of $\lambda \cdot \{(x_c - x_0 - ct_c \cdot n_x)^2 + (y_c - y_0 - ct_c \cdot n_y)^2 + (z_c - z_0 - ct_c \cdot n_z)^2\}$ is added to the expression (13), where ($x_c$, $y_c$, $z_c$, $t_c$) is four-dimensional coordinates of the end point of the first track. Alternatively, in place of addition to the function of the least-squares method, the end point of the first track may be set as an initial condition for estimation of the second track. According to the present exemplary embodiment, the information on the traveling direction of the light beam not only in the XY plane but also in the Z direction can be obtained. This makes it possible to measure the refractive index distribution in the three-dimensional directions without moving the object.

Further, since the information on the light beam in the three-dimensional direction can be obtained, it is possible to measure the refractive index distribution with high accuracy as compared with a case where the refractive index distribution is measured on the XY plane.

Further, according to the present exemplary embodiment, it is possible to measure the refractive index distribution of the object by adjusting the arrangement position of the object. In other words, it is possible to measure the refractive index distribution of the object by changing the traveling direction of the pulsed laser light without changing the configuration of the photodetection system. This makes it possible to measure the refractive index distribution irrespective of a size of the object, and to prevent upsizing of the photodetection system.

The scattered light is detected a plurality of times. This is to accurately determine whether the light speed has been changed due to change of the refractive index or due to change of the apparent speed. FIG. 9 is a graph illustrating a theoretically calculated relationship between the light track position x on the sensor surface and the detection time t'. As illustrated in FIG. 9, data of behavior in the case where the light speed is changed due to change of the refractive index and data of behavior in the case where the light speed is changed due to change of the apparent speed are different from each other. More specifically, the light speed is constantly changed in the case where the apparent speed is changed, whereas the light speed is not constantly changed in the case where the refractive index is changed. As described above, the trend in a wide range is not coincident. Therefore, acquiring a plurality of pieces of data enables separate analysis of the refractive index and the light component in the traveling direction. This makes it possible to enhance detection accuracy of the refractive index distribution.

Further, in a case where the refractive index inside the observation target is continuously changed, the measurement data is divided into some small areas in a time space, and it is assumed that the refractive index is constant in each of the areas. This makes it possible to perform similar analysis.

Figure 10:
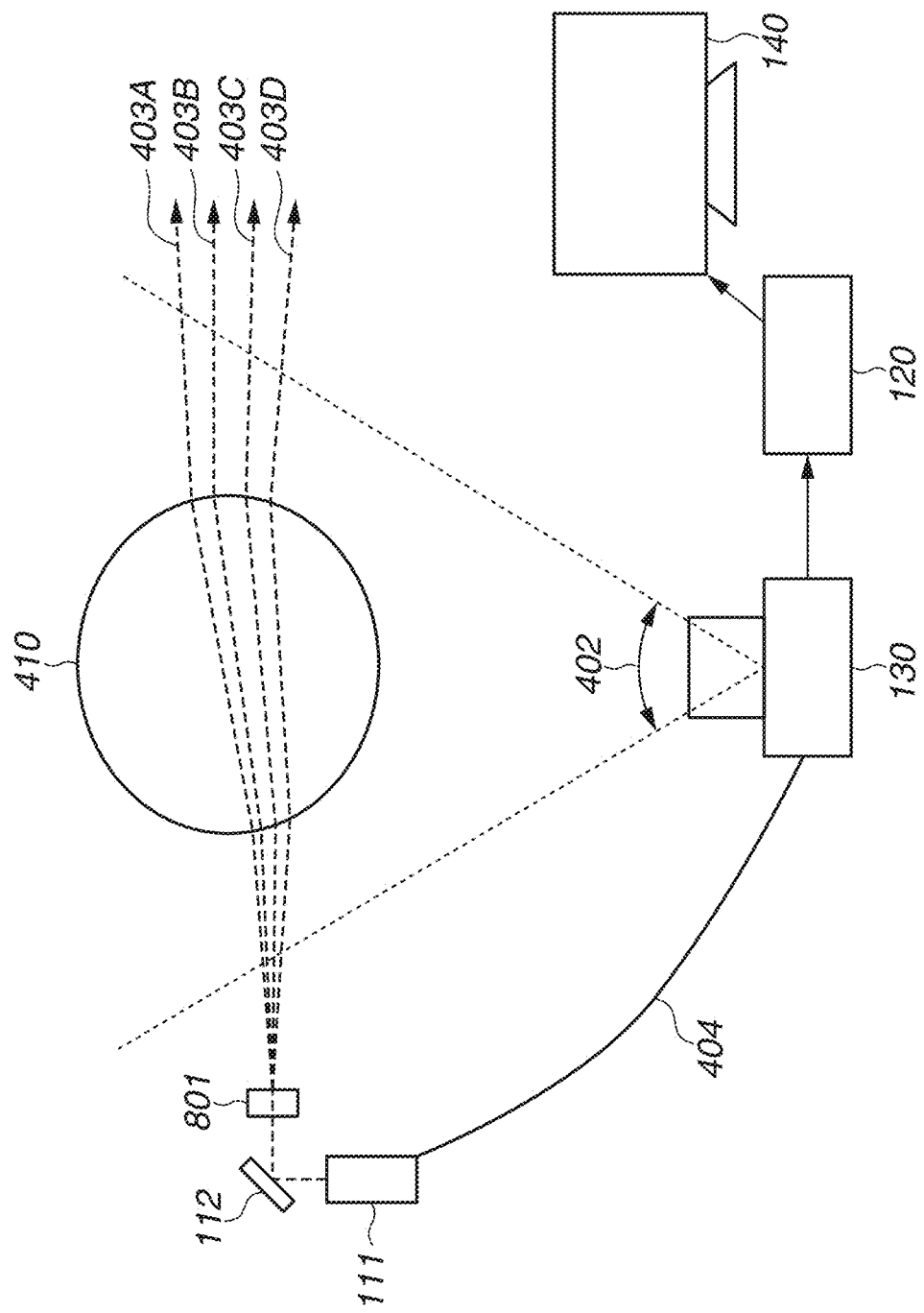
FIG. 10 is a configuration diagram illustrating a positional relationship among a photodetection unit, a light source, and an object according to a second exemplary embodiment.

FIG. 10 illustrates a photodetection system according to a second exemplary embodiment. The photodetection system according to the present exemplary embodiment is different from the photodetection system according to the first exemplary embodiment in that the light is caused to enter the object 410 after being diffused by a beam splitter 801. Matters other than matters described below are substantially the same as those in the first exemplary embodiment. Therefore, descriptions of the same matters are omitted.

The beam splitter 801 is an optical component dividing incident light at a predetermined division ratio. In FIG. 10, the division ratio is set so as to divide the incident light into four light beams 403A to 403D; however, the division ratio is not limited thereto. When the light is divided, light intensity of one light beam may be lowered, and the light may become difficult to be imaged by the camera. In the present exemplary embodiment, however, the avalanche diode is used as the image capturing device. Therefore, feeble light can be detected.

According to the present exemplary embodiment, one laser beam can be divided into a plurality of light beams by the beam splitter 801, and the plurality of light beams are caused to enter the object 410. This makes it possible to reduce the time necessary for detection of the object 410, and to shorten the measurement time.

Figure 11:
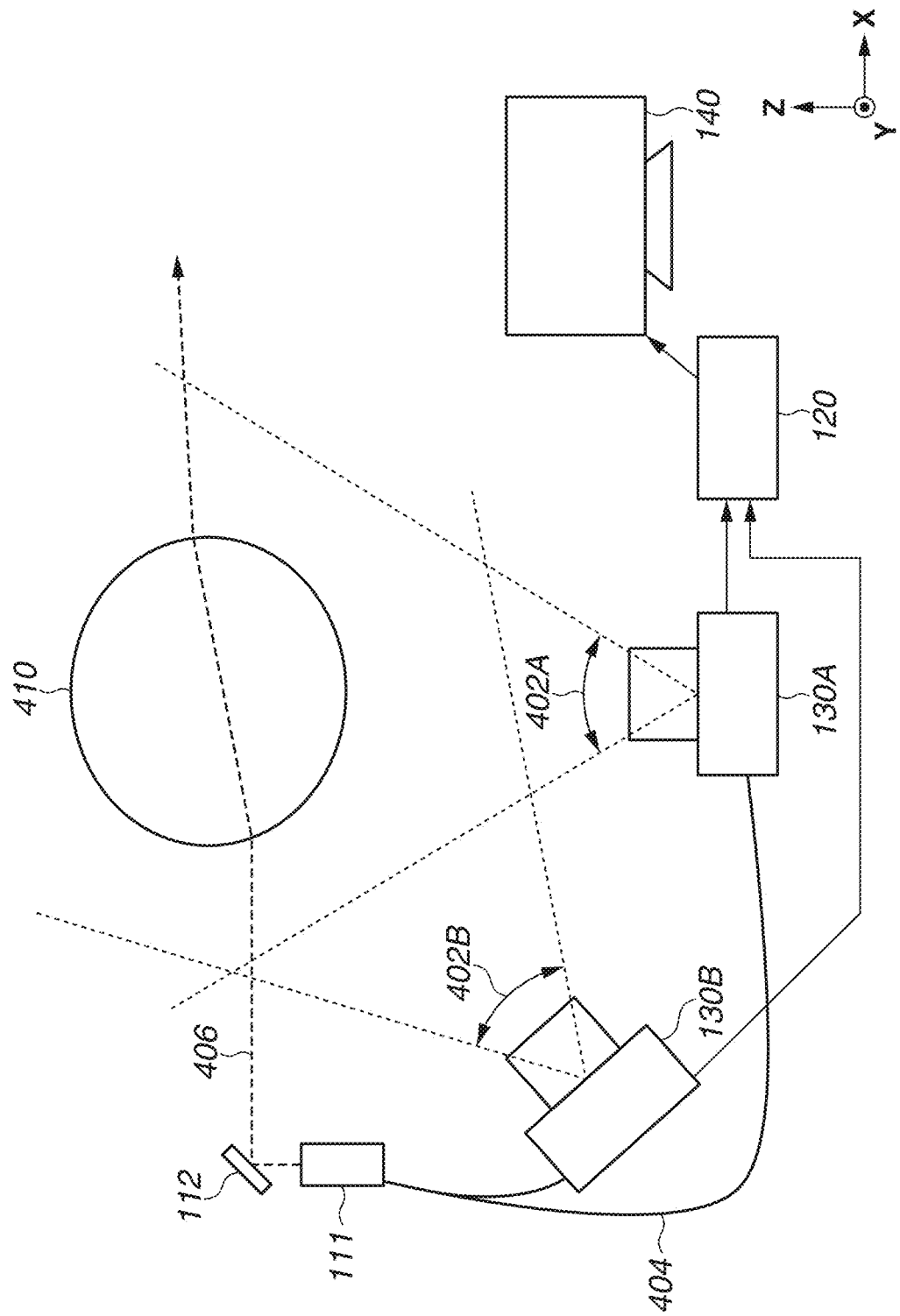
FIG. 11 is a configuration diagram illustrating a positional relationship among a photodetection unit, a light source, and an object according to a third exemplary embodiment.

FIG. 11 illustrates a photodetection system according to a third exemplary embodiment. The photodetection system according to the present exemplary embodiment is different from the photodetection system according to the first exemplary embodiment in that change of the refractive index is measured by using two or more photodetection units 130A and 130B. Matters other than matters described below are substantially the same as those in the first exemplary embodiment. Therefore, descriptions of the same matters are omitted.

As illustrated in FIG. 11, in the present exemplary embodiment, the photodetection unit 130B is disposed so as to image a plane different from the XY plane. In other words, an image capturing surface of the photodetection unit 130B is disposed on a plane different from the XY plane.

According to the present exemplary embodiment, the information in the Z direction can be obtained by the photodetection unit 130B. Accordingly, calculation in the Z direction by the calculation processing unit 120 becomes unnecessary, which facilitates processing of the calculation processing unit 120.

Figure 12:
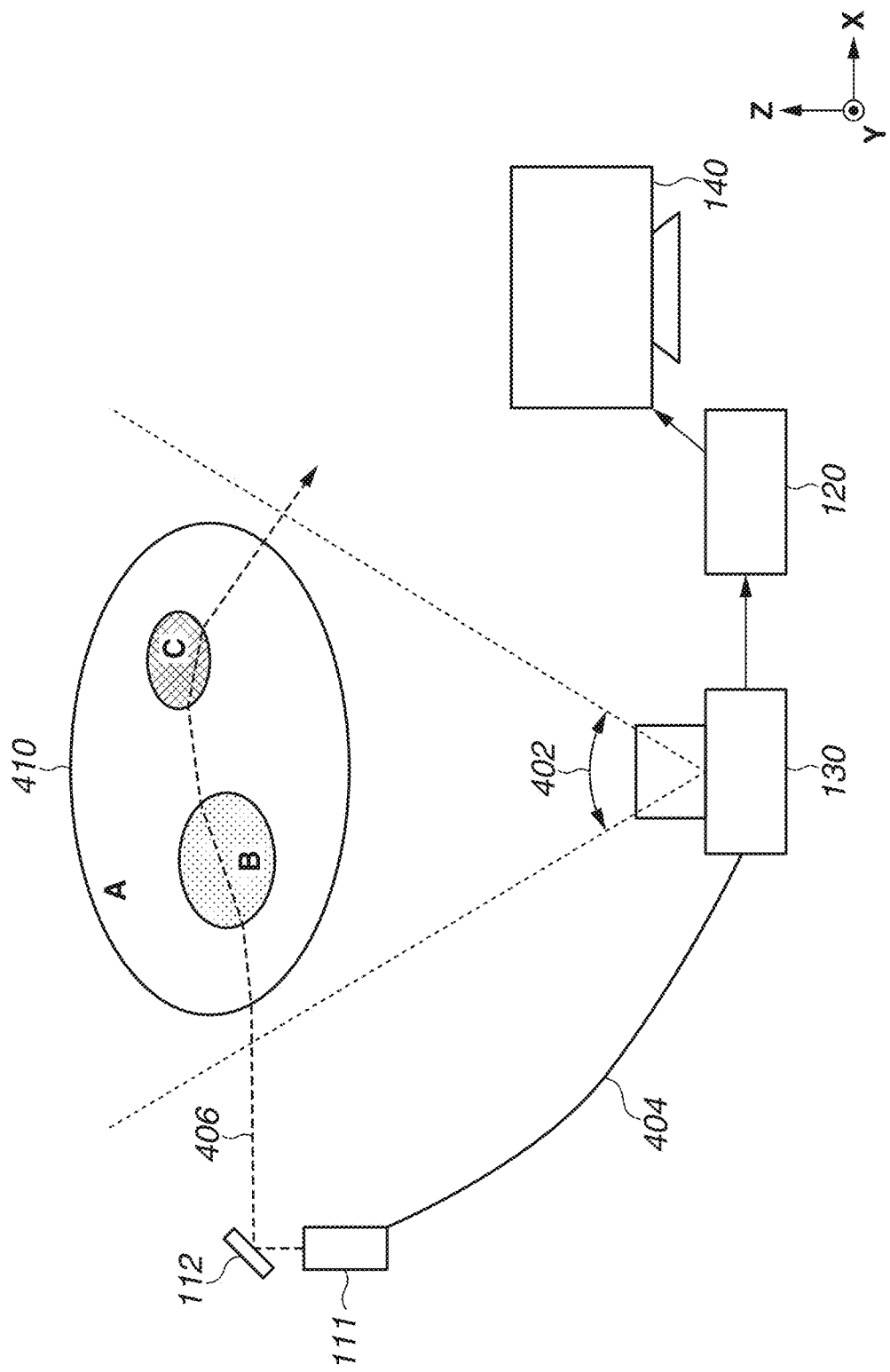
FIG. 12 is a configuration diagram illustrating a positional relationship among a photodetection unit, a light source, and an object according to a fourth exemplary embodiment.

FIG. 12 illustrates a photodetection system according to a fourth exemplary embodiment. The photodetection system according to the present exemplary embodiment is different from the photodetection system according to the first exemplary embodiment in that the object includes a plurality of areas different in refractive index. Matters other than matters described below are substantially the same as those in the first exemplary embodiment. Therefore, descriptions of the same matters are omitted.

In the present exemplary embodiment, refractive indexes are different among an area A, an area B, and an area C. Therefore, the speed of the traveling light is varied also inside the object. In a case where the refractive index is varied inside the object as described above, the groups can be subdivided depending on the light traveling direction. Further, the refractive index is determined in each of the subdivided groups.

According to the present exemplary embodiment, even in the object having the areas different in refractive index as illustrated in FIG. 12, it is possible to measure the refractive index distribution in each of the areas.

Figure 13:
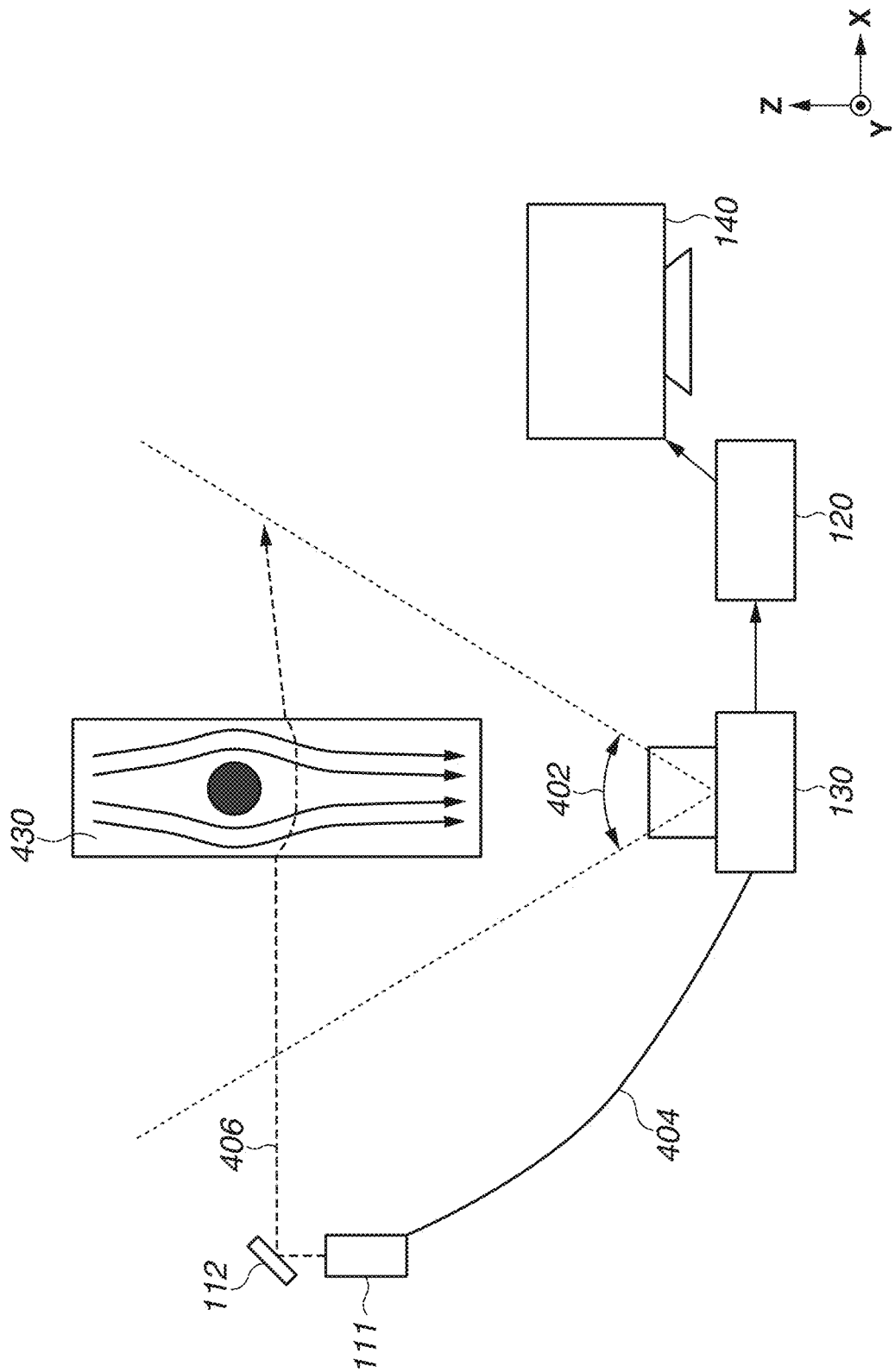
FIG. 13 is a configuration diagram illustrating a positional relationship among a photodetection unit, a light source, and an object according to a fifth exemplary embodiment.

FIG. 13 illustrates a photodetection system according to a fifth exemplary embodiment. The photodetection system according to the present exemplary embodiment is different from the photodetection system according to the first exemplary embodiment in that the object is fluid. Matters other than matters described below are substantially the same as those in the first exemplary embodiment. Therefore, descriptions of the same matters are omitted.

In the present exemplary embodiment, at least one of movement, a shape, and a density of the fluid can be measured.

As described above, the SPAD can be used for the photodetection unit 130. Therefore, it is possible to capture an image even when the object is a moving object like fluid, and to measure the refractive index distribution.

FIG. 14 illustrates a photodetection system according to a sixth exemplary embodiment. The photodetection system according to the present exemplary embodiment is different from the photodetection system according to the first exemplary embodiment in that the object is a living body. Matters other than matters described below are substantially the same as those in the first exemplary embodiment. Therefore, descriptions of the same matters are omitted.

As illustrated in FIG. 14, the object according to the present exemplary embodiment is a human hand 1210. In the present exemplary embodiment, a refractive index of blood inside a body such as the hand 1210 can be measured. Measuring the refractive index makes it possible to measure a blood sugar level.

The present disclosure is not limited to the above-described exemplary embodiments, and various modifications can be made. For example, an example in which a part of the configuration of any of the exemplary embodiments is added to the other exemplary embodiment and an example in which a part of the configuration of any of the exemplary embodiments is replaced with a part of the configuration of the other exemplary embodiment are also included in the exemplary embodiments of the present disclosure.

The above-described exemplary embodiments merely illustrate embodiment examples for implementation of the present disclosure, and the technical scope of the present disclosure is not limited by the above-described exemplary embodiments. In other words, the present disclosure can be implemented in various forms without departing from the technical idea or the main features of the present disclosure.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-124550, filed Jul. 21, 2020, which is hereby incorporated by reference herein in its entirety.

What is claimed is:

1. A system, comprising:
   a light source configured to emit pulsed laser light;
   a photodetection unit, including a plurality of photoelectric conversion units arranged in a two-dimensional plane, configured to detect scattered light of the pulsed laser light emitted from the light source and entering an object; and
   one or more processors; and
   at least one memory coupled to the one or more processors storing instructions that, when executed by the one or more processors, cause the one or more processors to function as:

a timing control unit configured to control an emission timing of the light source and a detection timing of the photodetection unit;

a calculation processing unit configured to estimate change of a refraction index of the object from change of light speed of the detected scattered light; and an extraction unit configured to measure a light beam traveling direction of the pulsed laser light in three-dimensional information from time information.

2. The system according to claim 1,
wherein the photodetection unit detects scattered light a plurality of times, and
wherein the calculation processing unit estimates distribution of the refractive index of the object.

3. The system according to claim 1,
wherein the calculation processing unit estimates light speed of scattered light on a three-dimensional plane including a direction orthogonal to the two-dimensional plane from the scattered light on the two-dimensional plane, and
wherein the calculation processing unit estimates change of the refractive index of the object on the three-dimensional plane.

4. The system according to claim 1, wherein each of the photoelectric conversion units includes an avalanche diode.

5. The system according to claim 1, wherein the object includes a first area and a second area different in refractive index from the first area.

6. The system according to claim 1, wherein the photodetection unit includes two or more cameras.

7. The system according to claim 1, wherein the object is a living body.

8. The system according to claim 1, wherein the calculation processing unit measures at least one of movement, a shape, and a density of fluid.

9. The system according to claim 1, wherein the calculation processing unit measures a refractive index of blood inside a body.

10. The system according to claim 9, wherein the calculation processing unit measures a blood sugar level from the refractive index of the blood.

11. The system according to claim 1,
wherein each of the photoelectric conversion units includes an avalanche diode, and
wherein a time interval from start of light emission by the light source to start of photodetection by the avalanche diode during a first frame period is different from a time interval from start of light emission by the light source to start of photodetection by the avalanche diode during a second frame period.

12. The system according to claim 11, further comprising:
a counter configured to count light entering the avalanche diode; and
a control unit provided between the avalanche diode and the counter, the control unit being a switch or a logic circuit.

13. The system according to claim 11, further comprising:
a counter configured to count light entering the avalanche diode; and
a control unit configured to provide a signal to operate or not to operate the counter, to the counter.

* * * * *